United States Patent
Kondo et al.

(10) Patent No.: US 12,265,008 B2
(45) Date of Patent: Apr. 1, 2025

(54) PARTICLE MEASURING DEVICE

(71) Applicant: RION CO., LTD., Kokubunji (JP)

(72) Inventors: Kaoru Kondo, Kokubunji (JP);
Kazuna Bando, Kokubunji (JP);
Takuya Tabuchi, Kokubunji (JP); Sota Kondo, Kokubunji (JP)

(73) Assignee: RION CO., LTD., Kokubunji (JP)

( * ) Notice: Subject to any disclaimer, the term of this patent is extended or adjusted under 35 U.S.C. 154(b) by 210 days.

(21) Appl. No.: 17/642,940

(22) PCT Filed: Dec. 17, 2020

(86) PCT No.: PCT/JP2020/047150
§ 371 (c)(1),
(2) Date: Mar. 14, 2022

(87) PCT Pub. No.: WO2021/132017
PCT Pub. Date: Jul. 1, 2021

(65) Prior Publication Data
US 2022/0364971 A1    Nov. 17, 2022

(30) Foreign Application Priority Data

Dec. 27, 2019 (JP) ................ 2019-237757

(51) Int. Cl.
*G01N 15/0227*    (2024.01)
*G01N 21/05*    (2006.01)
*G01N 21/01*    (2006.01)

(52) U.S. Cl.
CPC ........ *G01N 15/0227* (2013.01); *G01N 21/05* (2013.01); *G01N 2021/0112* (2013.01); *G01N 2021/052* (2013.01)

(58) Field of Classification Search
CPC .............. G01N 15/0227; G01N 21/05; G01N 2021/0112; G01N 2021/052;
(Continued)

(56) References Cited

U.S. PATENT DOCUMENTS

| | | | |
|---|---|---|---|
| 4,920,275 A * | 4/1990 | Itoh | G01N 15/0205 356/338 |
| 6,465,802 B1 * | 10/2002 | Matsuda | G01N 15/0205 356/442 |

(Continued)

FOREIGN PATENT DOCUMENTS

| | | |
|---|---|---|
| JP | 2008-089540 A | 4/2008 |
| JP | 2018-179971 A | 11/2018 |

(Continued)

OTHER PUBLICATIONS

Japanese Patent Office, Notice of Reasons for Refusal, Application No. JP 2019-237757, dated Sep. 26, 2023, in 7 pages.

(Continued)

*Primary Examiner* — Isiaka O Akanbi
(74) *Attorney, Agent, or Firm* — PROCOPIO, CORY, HARGREAVES & SAVITCH LLP (57) ABSTRACT

Provided is a particle measurement device in which irradiation light emitted by a light source is expanded by an expander in a shape satisfying the requirements of a diffractive optical element, converted into parallel light, and made to enter the diffractive optical element. The diffractive optical element shapes the irradiation light entering therein into a flat top beam in which the cross section in the focal position thereof has an elongate rectangle shape. The intensity distribution of light can be made substantially uniform in a detection area formed by the shaped irradiation light.

11 Claims, 8 Drawing Sheets

(58) Field of Classification Search
CPC ... G01N 2015/1493; G01N 2021/8592; G01N 15/1434; G01N 15/0205; G01N 21/01; G01N 15/0211; G01N 15/1436; G01N 21/4788; G01N 21/53; G01N 2015/1029
USPC ............... 356/335, 336, 432, 436, 442, 337
See application file for complete search history.

(56) References Cited

U.S. PATENT DOCUMENTS

| | | | |
|---|---|---|---|
| 6,903,818 B2 | 6/2005 | Cerni | |
| 9,857,283 B1 | 1/2018 | Tatarkiewicz | |
| 10,234,370 B2 | 3/2019 | Kato | |
| 10,620,444 B2 | 4/2020 | Kumkar | |
| 10,820,943 B2 | 11/2020 | Grace | |
| 10,837,890 B2* | 11/2020 | Kondo | G01N 15/1434 |
| 11,237,095 B2 | 2/2022 | Rodier | |
| 2003/0002543 A1 | 1/2003 | Lee | |
| 2008/0186490 A1* | 8/2008 | Chu | G01N 15/1434 362/257 |
| 2010/0220315 A1* | 9/2010 | Morrell | G01N 15/1436 356/73 |
| 2010/0238442 A1* | 9/2010 | Heng | G01N 15/1433 382/294 |
| 2012/0281216 A1* | 11/2012 | Ilkov | G01N 15/1459 356/442 |
| 2013/0050782 A1* | 2/2013 | Heng | G01N 15/1434 358/494 |
| 2014/0264097 A1* | 9/2014 | Heanue | G02B 27/0966 250/435 |
| 2016/0370280 A1* | 12/2016 | Yamamoto | G01N 15/1434 |
| 2017/0003214 A1 | 1/2017 | Tatarkiewicz et al. | |
| 2017/0102314 A1 | 4/2017 | Diebold | |
| 2017/0122860 A1 | 5/2017 | Tatarkiewicz et al. | |
| 2017/0227439 A1 | 8/2017 | Tatarkiewicz | |
| 2017/0328826 A1 | 11/2017 | Diebold et al. | |
| 2017/0343469 A1 | 11/2017 | Tatarkiewicz et al. | |
| 2017/0370825 A1 | 12/2017 | Tatarkiewicz et al. | |
| 2018/0120214 A1 | 5/2018 | Kato et al. | |
| 2019/0049356 A1* | 2/2019 | Yamamoto | G01N 15/147 |
| 2019/0277745 A1* | 9/2019 | Matsuda | G01N 15/1434 |
| 2020/0124514 A1* | 4/2020 | Kondo | G01N 15/1433 |
| 2020/0240896 A1* | 7/2020 | Karasikov | G01N 15/1459 |
| 2020/0355599 A1* | 11/2020 | Rodier | G01N 15/1434 |
| 2021/0131945 A1 | 5/2021 | Diebold et al. | |
| 2021/0348999 A1 | 11/2021 | Kato | |

FOREIGN PATENT DOCUMENTS

| | | |
|---|---|---|
| JP | 2019-521316 A | 7/2019 |
| JP | 6549747 B2 | 7/2019 |
| JP | 2019-527348 A | 9/2019 |
| WO | 2016-159131 A1 | 6/2016 |
| WO | 2019-082186 A1 | 5/2019 |

OTHER PUBLICATIONS

PCT; International Search Report (ISA/210) issued in International Application No. PCT/JP2020/047150; Mailed Mar. 9, 2021; 3 pages.
PCT; Written Opinion of the International Searching Authority (ISA/237) issued in International Application No. PCT/JP2020/047150; Mailed Mar. 9, 2021; 4 pages.
European Patent Office, Extended European Search Report, Application No. 20906454.2-1001, dated Jan. 29, 2024, in 10 pages.
Taiwanese Patent Office, IPO Examination Report, Application No. 109145938, dated Jun. 14, 2024, in 12 pages.
Korean Patent Office, Office Action, Application No. 10-2022-7008457, dated Jan. 15, 2025, in 13 pages.
Chinese Patent Office, Office Action, Application No. 2020800064718.0, dated Dec. 26, 2024, in 18 pages.

* cited by examiner

FIG. 7A [EMBODIMENT]

FIG. 7B [COMPARATIVE EXAMPLE]

FIG. 8

PARTICLE MEASURING DEVICE

CROSS-REFERENCE TO RELATED APPLICATIONS

This application is US National Stage of International Patent Application PCT/JP2020/047150, filed Dec. 17, 2020, which claims benefit of priority from Japanese Patent Application JP2019-237757, filed Dec. 27, 2019, the contents of both of which are incorporated herein by reference.

TECHNICAL FIELD

The present invention relates to a particle measuring device.

BACKGROUND ART

An FPT (flow particle tracking) method is known as one technique for obtaining a size of a particle floating in a sample. The FPT method is a technique of tracking a movement of a particle by irradiating a sample with light, detecting light scattered from the particle, and measuring a size of the particle that is close to its geometrical size from a movement amount by diffusion. Known as a measuring device using the FPT method (hereinafter referred to as an "FPT device") is a device that measures a particle size by separating a movement of a particle by diffusion from a transport movement produced by a flow of a sample (for example, refer to Patent Literature 1).

CITATION LIST

Patent Literature

Patent Literature 1: WO 2016/159131

SUMMARY OF INVENTION

Technical Problem

In the above-described FPT device, positions of a moving particle at individual time points are determined by capturing the movement of particle every predetermined time while it passes through a detection region, a mean-square displacement is calculated by obtaining movement distances in respective time intervals, and a particle size is measured on the basis of the mean-square displacement (a particle size determined in this manner will be hereinafter referred to as a "diffusion coefficient-correspondent size). If irradiation light is a Gaussian beam, the length of the particle passing direction (medium flow direction) in a detection region is not constant. In this case, the number of times to be captured varies depending on where a particle passes in the detection region. That is, the particle size measurement accuracy varies depending on the particle passing position, as a result, the particle size resolution of the FPT device is deteriorated. In the FPT device, a refractive index of a particle can be obtained by determining a diffusion coefficient-correspondent size and scattered light intensity of the particle at the same time. However, variations of measurement values of the diffusion coefficient-correspondent size and the scattered light intensity influence the accuracy of the refractive index in a negatively synergistic manner. On the other hand, in a light scattering-type particle measuring device, a particle size is determined on the basis of detected light intensity (a particle size determined in this manner will be hereinafter referred to as a "scattered light-correspondent size). Thus, the particle size resolution of this particle measuring device is also deteriorated in the case where the energy density of irradiation light is not uniform in a detection region.

If a smaller detection region is set, the particle detection sensitivity could be improved because the energy density in the detection region could be increased. However, in this case, the effective flow rate of a sample decreases, which influences the performance of the particle measuring device. Setting a small detection region is thus not preferable.

An object of the present invention is to provide a technique for improving the particle size resolution.

Solution to Problem

In order to solve the foregoing problem, the present invention employs a particle measuring device described below. It is noted that words that are parenthesized below are just examples and the present invention is not limited to them.

That is, a particle measuring device according to the present invention includes a diffractive optical element ("DOE") configured to shape light for irradiating a particle into a flat top beam, where a cross section of the flat top beam at a focal position has a substantially oblong-and-sheet shape. More specifically, the particle measuring device according to the present invention further includes a flow cell configured to form a flow passage for a sample therein; a light source configured to emit irradiation light; a detection unit configured to detect light scattered from a particle included in the sample, where the particle passes a detection region formed in a prescribed section of the flow passage by irradiating with the light, at a position obtained by extending the prescribed section in a flow direction of the sample; and an analyzing unit configured to obtain a particle size of the particle with analyzing on the basis of the scattered light, wherein the DOE shapes the irradiation light and irradiates the sample flowing through the prescribed section with shaped irradiation light.

As for techniques for shaping a light beam into a flat top beam, lens combinations using a cylindrical lens, aspherical lenses, etc. are known. These techniques are associated with many problems that need to be solved for practical use, such as only part of a light beam assumes a flat top shape and necessity of burdensome adjustments. In contrast, a DOE has an advantage that it is highly efficient and can form a flat top shape easily.

The particle measuring device according to the above aspect is equipped with the DOE. In this particle measuring device, irradiation light is shaped by the DOE into a flat top beam whose cross section at a focal position is substantially an oblong-and-sheet shape (i.e., long and narrow rectangle) and is thus made irradiation light that is shaped like a sheet extending in the depth-of-focus direction. A particle detection region is formed by inputting the thus-shaped irradiation light. Thus, according to this aspect, by shaping irradiation light into a sheet shape, the energy density of irradiation light in the detection region can be made high and the particle detection sensitivity can be improved. Light scattered from particles floating in a wide range can be detected and a detection flow rate can be increased. Furthermore, the use of a flat top beam makes it possible to improve the particle size resolution (analysis resolution to obtain particle size).

The above particle measuring device further includes an adjusting unit configured to adjust the irradiation light emitted from the light source so that to have a diameter and an angle of beam divergence that satisfy requirements of the DOE, and enters adjusted irradiation light on the DOE.

In the particle measuring device according to this aspect, the adjusting unit (beam expander) adjusts the irradiation light emitted from the light source so that it comes to have a shape (diameter and angle of beam divergence) that satisfies the requirements of the DOE. Thus, since irradiation light whose shape has been adjusted to an optimum shape enters the DOE, this aspect allows the DOE to shape irradiation light more accurately.

Preferably, in some of the above particle measuring devices, the DOE shapes the irradiation light into a flat top beam in which a variation of an optical energy density in a depth-of-focus direction is in a prescribed range.

In the particle measuring device according to this aspect, the light intensity is approximately uniform in the entire detection region. Thus, irrespective of where in the detection region particles having the same particle size pass, light scattered from these particles can be detected at approximately the same intensity. This contributes to improve of the particle size resolution.

Even preferably, some of the above particle measuring devices further includes a removing unit configured to remove high-order diffraction light generated in a process that the DOE shapes the irradiation light. The removing unit removes the high-order diffraction light stepwise while causing the irradiation light shaped by the DOE to pass itself, by means of a plurality of slits that have different shapes and are arranged so as to be spaced from each other.

In the particle measuring device according to this aspect, the removing unit (slit plates) allows shaped irradiation light to pass itself and go toward the focal point while removing high-order diffraction light generated during the process of shaping of the irradiation light by the DOE. Thus, according to this aspect, noise can be reduced because stray light that would otherwise obstruct the measurement is removed whereas light necessary for the measurement is secured.

Further preferably, in some of the above particle measuring devices, the detection unit captures the light scattered from the particle at a prescribed frame rate. The analyzing unit calculates movement amount of the particle in a plane that is perpendicular to the flow direction on the basis of bright spot positions of the particle corresponding to the scattered light captured in respective frame images, and obtains a diffusion coefficient-correspondent size of the particle with analyzing on the basis of the movement amount.

In the particle measuring device according to this aspect, the light scattered from the particle is captured by the detection unit (imaging unit). Movement amount of the particle in a plane (XZ plane) that is perpendicular to the sample flow direction (Y direction) is calculated on the basis of scattered light captured in frame images, and a particle size, that is, a diffusion coefficient-correspondent size, of the particle is obtained with analyzing on the basis of the calculated movement amount. That is, this particle measuring device is an FPT device.

According to this aspect, since the irradiation light that forms the detection region is shaped into a flat top shape, the light intensity is approximately uniform in the entire detection region. Thus, irrespective of where in the detection region a particle passes in the Y direction, a movement of the particle can be traced a constant number of times by capturing the movement of particle to produce approximately the same number of frames, whereby the particle size resolution of a diffusion coefficient-correspondent size can be improved.

Alternatively, in some of the above particle measuring devices, the detection unit receives the scattered light and outputs signals corresponding to its intensity values and the analyzing unit obtains a scattered light-correspondent size of the particle with analyzing on the basis of the signals.

In the particle measuring device according to this aspect, light scattered from the particle is detected by the detection unit (e.g., photodetecting element) and signals corresponding to its intensity values are output from the detection unit. A particle size, that is, scattered light-correspondent size, of the particle is obtained with analyzing on the basis of the signals. That is, this particle measuring device is a light scattering particle counter.

According to this aspect, since the irradiation light that forms the detection region is shaped into a flat top shape, the irradiation light intensity is approximately uniform in the entire detection region. Thus, intensity values of light scattered from particles having the same particle size can be made the same irrespective of where they pass, whereby the particle size resolution of a scattered light-correspondent size can be improved. Furthermore, refractive index resolution can be improved in a case of calculating a refractive index of a particle from a scattered light-correspondent size and a diffusion coefficient-correspondent size.

Advantageous Effect of Invention

As described above, the invention can improve the particle size resolution.

DESCRIPTION OF EMBODIMENT

An embodiment of the present invention will be hereinafter described with reference to the drawings. The embodiment described below is a preferred embodiment and the invention is not limited to this example disclosure.

<Configuration of Particle Measuring Device>

Figure 1:
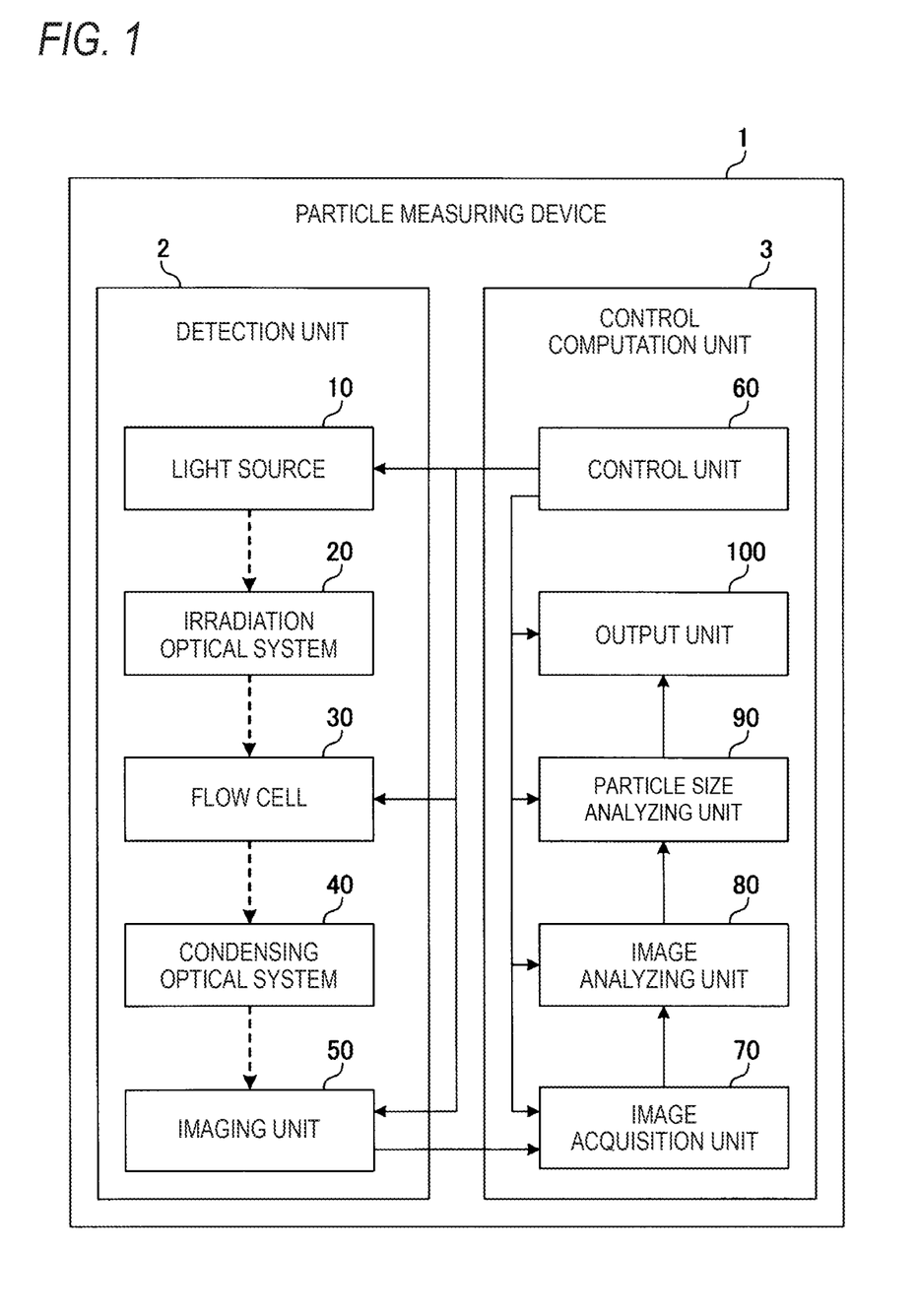
FIG. 1 is a block diagram showing a configuration of a particle measuring device according to one embodiment.

FIG. 1 is a block diagram showing a configuration of a particle measuring device 1 according to one embodiment. The configuration of a case that the particle measuring device 1 is an FPT device will be described here as an example.

As shown in FIG. 1, the particle measuring device 1 generally consists of a detection unit 2 and a control computation unit 3. Of these units, the detection unit 2 irradiates a sample fluid with light and detects scattered light generated by interaction between a particle floating in the sample fluid and the irradiation light. The control computation unit 3 controls individual devices constituting the detection unit 2 and performs a particle size analysis by determining movement amount of each particle on the basis of scattered light detected by the detection unit 2.

<Configuration of Detection Unit>

First, the configuration of the detection unit 2 will be described.

For example, the detection unit 2 includes a light source 10, an irradiation optical system 20, a flow cell 30, a condensing optical system 40, an imaging unit 50, etc. The light source 10, which is, for example, a semiconductor laser diode, emits single-mode ($TEM_{00}$ mode) circular laser light as irradiation light. The irradiation optical system 20 shapes the irradiation light emitted from the light source 10 into a prescribed shape and condenses it at an inside position in the flow cell 30. A specific configuration of the irradiation optical system 20 will be described later in detail by referring to another drawing.

The flow cell 30 is made of a transparent material such as quartz or sapphire and is formed with, inside it, a flow passage into which a sample fluid is caused to flow. When irradiation light enters the flow cell 30, a detection region is formed in the flow passage. The condensing optical system 40, which is, for example, an optical lens, condenses light scattered from a particle passing through the detection region on the imaging unit 50. The imaging unit 50 which is, for example, a camera equipped with an image sensor such as a CCD (charge-coupled device) or a CMOS (complementary metal-oxide-semiconductor) sensor, captures the scattered light condensed on the light-receiving surface of the image sensor by the condensing optical system 40.

Figure 2A:
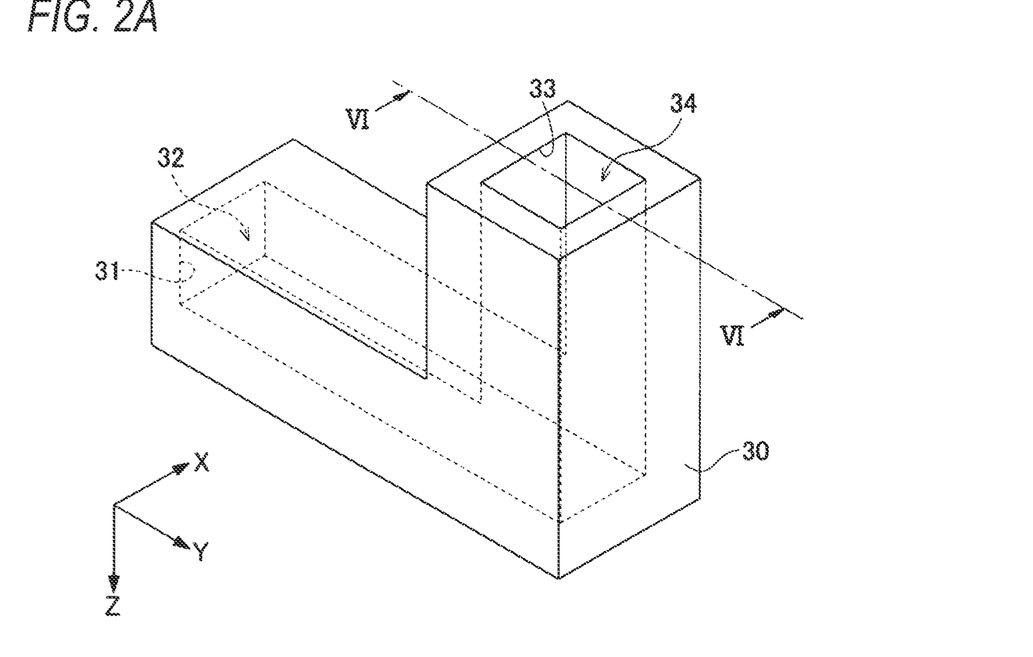
FIGS. 2A and 2B show, in a simplified manner, a configuration of a detection unit employed in the one embodiment.
Figure 2B:
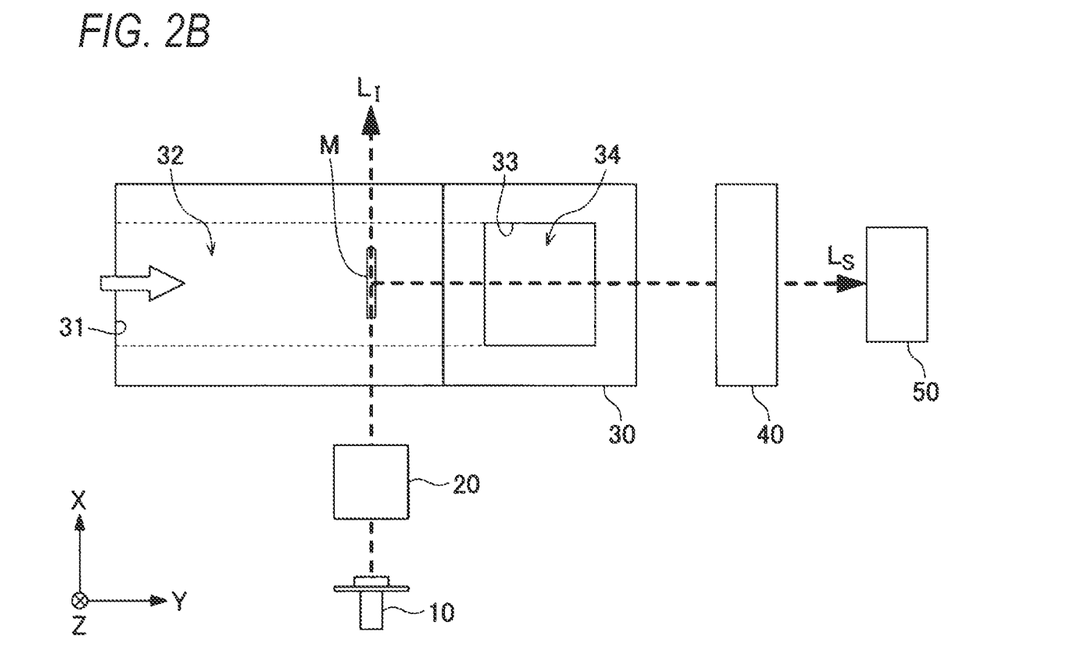

FIGS. 2A and 2B show, in a simplified manner, the configuration of the detection unit 2 employed in the one embodiment.

FIG. 2A is a perspective view of the flow cell 30. The flow cell 30 is shaped like a character "L" and is formed with, inside, an L-shaped flow passage in which a first section 32 which extends from a first spread angle 31 in the Y direction and a second section 34 which extends from a second spread angle 33 in the Z direction communicate with each other at their respective ends. A sample fluid is caused to flow into the first section 32 from the first spread angle 31, passes through the second section 34, and is ejected to the outside from the second spread angle 33. It suffices that the flow cell 30 have such a shape as to include a portion that is bent like a character "L" and may be shaped like a character "U" or a crank rather than a character "L."

FIG. 2B is a plan view showing, in a simplified manner, the configuration of the detection unit 2, in particular, positional relationships between individual units. The irradiation optical system 20 enters shaped irradiation light $L_1$ on the flow cell 30 from a direction (X direction) that is perpendicular to the sample fluid flow direction (Y direction) in the first section 32. The condensing optical system 40 and the imaging unit 50 are disposed at positions that are opposed to a flow of the sample fluid in the first section 32, that is, positions obtained by extending the first section 32 in the sample fluid flow direction, and condense and capture light $L_S$ scattered from a particle that has passed through a detection region M. With this configuration, a movement (diffusive movement) of an individual particle in the XZ plane is observed. How the scattered light $L_S$ is captured will be described in more detail using another drawing.

Figure 3:
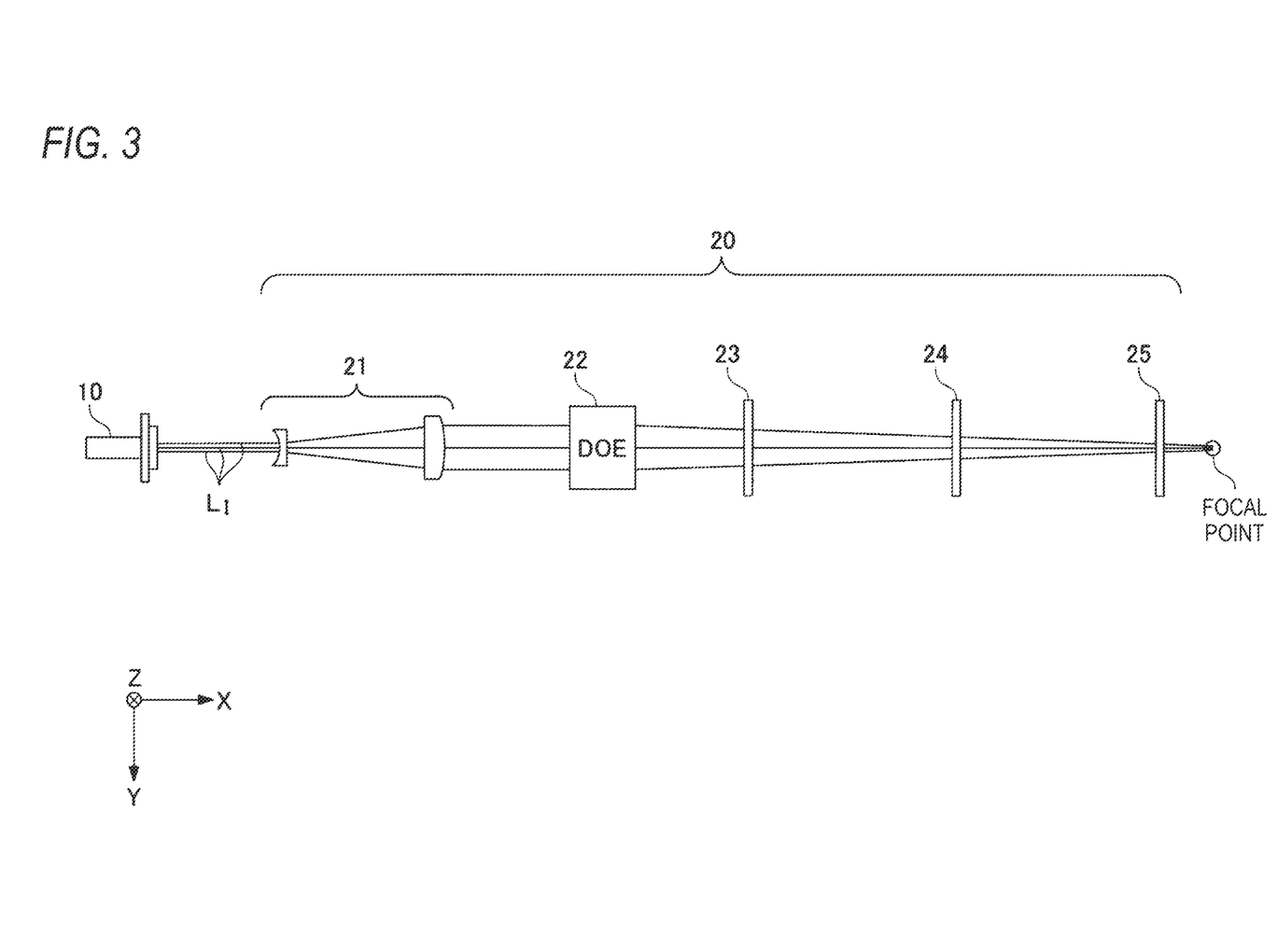
FIG. 3 shows, in a simplified manner, a configuration of an irradiation optical system employed in the one embodiment.

FIG. 3 shows, in a simplified manner, the configuration of the irradiation optical system 20 employed in the one embodiment. To facilitate understanding of the present invention, in FIG. 3 the distances between the individual components, a variation of the beam diameter of irradiation light $L_1$, a focal point size, etc. are exaggerated and do not coincide with actual scale ratios.

For example, the irradiation optical system 20 includes a beam expander 21, a DOE 22, a first slit plate 23, a second slit plate 24, a third slit plate 25, etc. The beam expander 21, which consists of plural optical lenses, changes single-mode irradiation light $L_1$ emitted from the light source 10 into a shape (size) required by the DOE 22 while adjusting its angle of beam divergence. For example, the beam expander 21 expands the irradiation light $L_1$ and turns it into parallel light having a diameter that is suitable for the DOE 22 employed in the embodiment and enters the parallel light on the DOE 22 at a proper position. That is, the beam expander 21 adjusts the irradiation light $L_1$ into a shape that is most suitable for the DOE 22. Although a Galileo-type beam expander consisting of two optical lenses is shown in FIG. 3 as an example, a Kepler-type beam expander may be employed instead and the number of optical lenses used is not limited to two.

The DOE 22 performs beam shaping on the irradiation light $L_1$ received. More specifically, the DOE 22 shapes irradiation light $L_1$ having an intensity distribution that is close to a single-mode Gaussian distribution (Gaussian beam) into a flat top (top-hat beam) beam having a uniform intensity distribution and to have, around a focal point, a beam shape as sheet-like shape extending in the depth-of-focus direction. The term "sheet-like shape" means a three-dimensional shape having a plane and a small thickness, and has, when cut by a plane including its thickness direction, a sectional shape that is like a long and narrow rectangle (line shape or approximately oblong-and-sheet shape).

For example, the DOE 22 employed in the embodiment shapes irradiation light $L_1$ into a flat top beam whose cross section at the focal position assumes a long and narrow, rectangular shape in which the length of longer sides (in the Z direction) is 2 mm and the length of shorter sides (in the Y direction) is 20 μm that is the longer sides is 100 times as long as the shorter sides. Where a region of the focal position of irradiation light $L_1 \pm 1$ mm in the depth-of-focus direction (length in the X direction: 2 mm) is to be employed as a detection region, it is necessary to design a DOE capable of controlling the optical energy density variation in that region due to defocusing to a prescribed range, for example, within ±20%. Since the DOE 22 employed in the embodiment is designed so as to satisfy this condition, it can form a sheet-shaped detection region in which the optical energy density variation is within the allowable range. In the embodiment, a DOE beam shaper (diffractive optical element) produced by Sumitomo Electric Industries, Ltd. is used as the DOE 22. The beam sectional shape (hereinafter referred as a "beam shape") at the focal position and its intensity profile there will be described later in more detail using another drawing.

Incidentally, shaping a Gaussian beam into a flat top beam can also be realized by using plural lenses. However, where spherical lenses (including an fθ lens, a cylindrical lens, etc.) are used, it is necessary to combine plural lenses in a complicated manner and it is still difficult to form a satisfactory flat top beam. Where aspherical lenses are used, high-level adjustments and configuration stability are required because the angles of incidence of a light beam on the lenses and the beam shape greatly influence a resulting flat top shape. In contract, by virtue of the use of the DOE 22, the present embodiment enables shaping into a flat top beam with a simple configuration.

For example, the three slit plates 23, 24, and 25 are disposed between the DOE 22 and the focal point. These slit plates serve to remove high-order diffraction light that is generated when irradiation light $L_1$ passes through the DOE 22. High-order diffraction light needs to be removed because it acts as stray light and generates noise in a measurement. Plural slits are arranged at proper positions depending on how a principal light beam is separated from high-order diffraction light. To remove, for example, high-order diffraction light having a large angle of beam divergence, it suffices to use a small slit plate as long as it is disposed close to the DOE 22. However, a larger slit plate is necessary as the slit for the case with more distance from the DOE 22. Furthermore, whereas it is difficult to remove high-order diffraction light having a small angle of beam divergence by a slit plate that is located close to the DOE 22 because its separation from a principal light beam is insufficient, high-order diffraction light can be removed more easily as the position of a slit plate becomes more distant from the DOE 22 because it is separated from the principal light beam sufficiently. Although the beam shape of irradiation light $L_1$ going from the DOE 22 toward the focal point varies depending on the position, beam shapes at respective positions have been calculated in advance by a simulation. Each slit plate is formed with, at a central portion, a slit that is a little larger than a beam shape of irradiation light $L_1$ at the position where the slit plate is disposed.

Figure 4A:
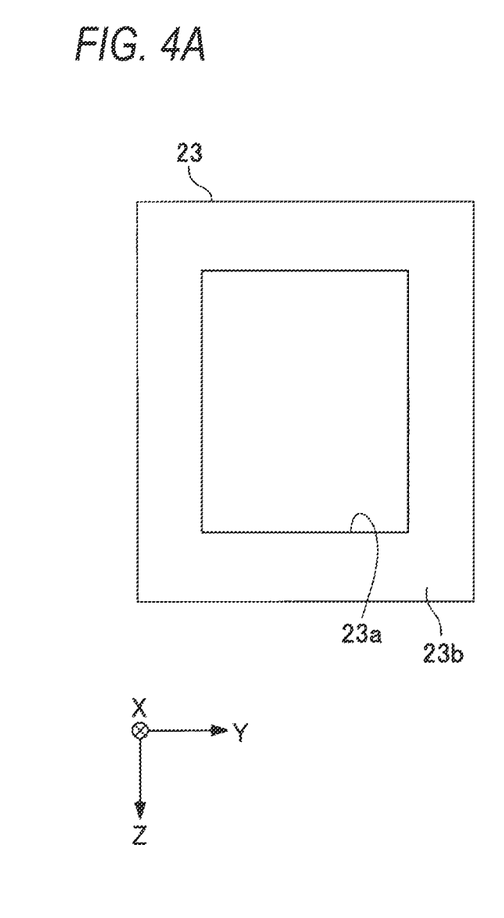
FIGS. 4A to 4C show shapes of respective slits employed in the one embodiment.
Figure 4B:
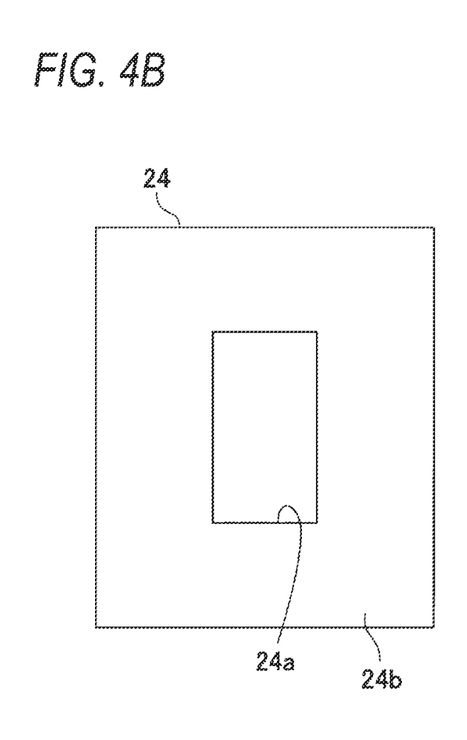
Figure 4C:
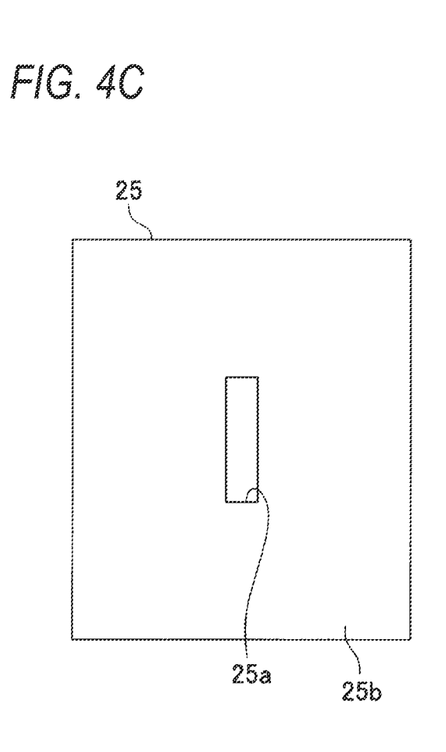

FIGS. 4A to 4C show shapes of respective slits employed in the one embodiment. Among these drawings, FIG. 4A shows the shape of a first slit 23a that is formed in the first slit plate 23, FIG. 4B shows the shape of a second slit 24a that is formed in the second slit plate 24, and FIG. 4C shows the shape of a third slit 25a that is formed in the third slit plate 25.

For example, each slit plate is formed with a concentric, rectangular slit that is a little larger than a beam shape. Comparing the three slit plates, the first slit plate 23 disposed on the most upstream side is formed with a largest slit 23a, the third slit plate 25 disposed on the most downstream side is formed with a smallest slit 25a, and the second slit plate 24 disposed at an intermediate position is formed with a slit 24a that is smaller than the slit 23a and larger than the slit 25a.

High-order diffraction light is generated because of the structure of a diffraction grating in a process that the beam shape of irradiation light $L_1$ is shaped in the DOE 22. As a result, shaped irradiation light $L_1$ is output from the DOE 22 toward the focal point, and also high-order diffraction light is output from it so as to diverge radially to appear as light dots.

When light reaches the first slit plate 23 after passing through the DOE 22, whereas high-order diffraction light diverging from the DOE 22 at large angles is interrupted by a first interruption surface 23b, the remaining light, that is, the shaped irradiation light $L_1$ and non-interrupted high-order diffraction light pass through the first slit 23a. When the light that has passed through the first slit 23a reaches the second slit plate 24, whereas high-order diffraction light diverging from the DOE 22 at medium angles is interrupted by a second interruption surface 24b, the remaining light passes through the second slit 24a. Furthermore, when the light that has passed through the second slit 24a reaches the third slit plate 25, whereas high-order diffraction light diverging from the DOE 22 at small angles is interrupted by a third interruption surface 25b, the remaining light passes through the third slit 25a.

By arranging plural slits in the above-described manner, shaped irradiation light $L_1$ can be caused to pass through the plural slits surely and reach the focal point to form a desired detection region while high-order diffraction light diverging from the DOE 22 is interrupted stepwise by plural interruption surfaces. Thus, noise can be effectively reduced by removing (deteriorating its intensity) stray light that would otherwise obstruct a measurement whereas light that is necessary for the measurement is secured reliably. This makes it possible to suppress the influence of noise on the measurement and improve the sensitivity of particle size detection.

Incidentally, the relative positions of the respective slits shown in FIG. 3 and the shapes of the respective slits shown in FIGS. 4A to 4C are just examples and the present invention is not limited to these examples. Further, the number of slit plates arranged can be changed as appropriate according to a situation.

Figure 5A:
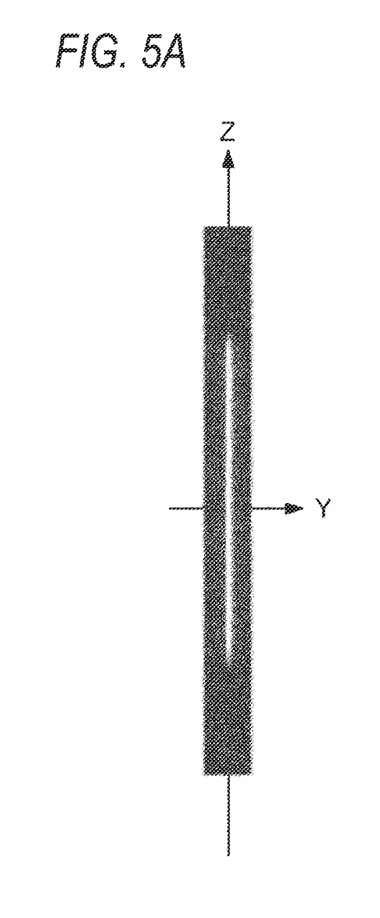
FIGS. 5A to 5C show a beam shape and an intensity distribution of irradiation light at a focal position.
Figure 5B:
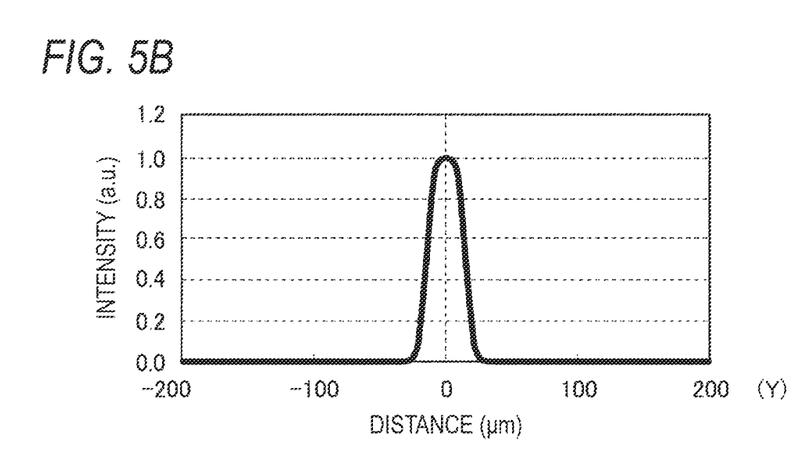
Figure 5C:
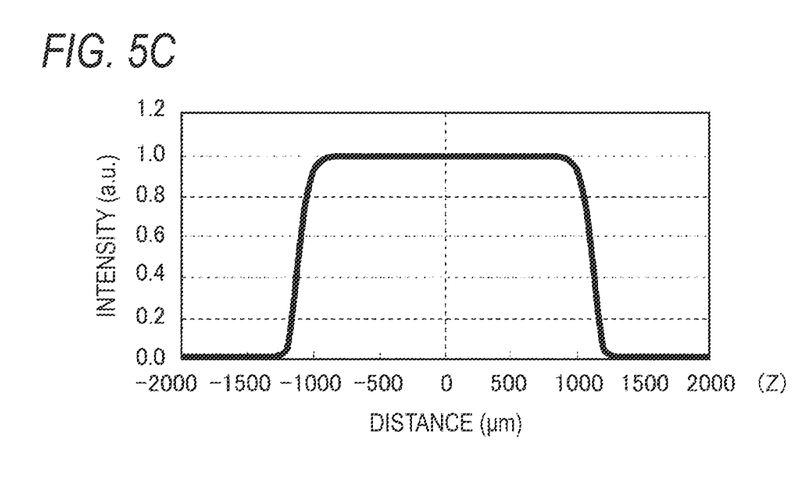

FIGS. 5A to 5C show a beam shape and an intensity distribution, at the focal position, of irradiation light $L_1$ shaped by the DOE 22.

FIG. 5A is a photograph showing a beam shape of irradiation light $L_1$ at the focal position is superimposed on the Y axis and the Z axis with the center of the beam shape as the origin. As shown in this figure, at the focal position, the irradiation light $L_1$ assumes a beam shape that is a long and narrow rectangular shape (line shape or approximate oblong-and-sheet shape) that is long in the Z direction.

FIG. 5B is a graph showing an intensity distribution, on the Y axis, of the beam shown in FIG. 5A. It is seen, from this graph, that the light intensity is uniform in the Y direction and has approximately a value 1.0 in a ±10 μm range centered at the origin (a central portion of 20 μm) and drops steeply from 1.0 to 0.0 in ranges of −30 to −10 μm and +10 to +30 μm (portions of about 20 μm outside the central portion).

FIG. 5C is a graph showing an intensity distribution, on the Z axis, of the beam shown in part FIG. 5A. It is seen, from this graph, that the light intensity is uniform in the Z direction and has approximately a value 1.0 in a ±1,000 μm range centered at the origin (a central portion of 2 mm) and drops steeply from 1.0 to 0.0 in ranges of −1,200 to −1,000 μm and +1,000 to +1,200 μm (portions of about 0.2 mm outside the central portion).

It is seen from these graphs that the intensity of the shaped irradiation light $L_1$ at the focal position is approximately uniform in the range of 20 μm (the length in the Y direction)×2 mm (the length in the Z direction).

The focal position of irradiation light $L_1$ is set in the flow passage (more specifically, in the first section 32) of the flow cell 30. When irradiation light $L_1$ enters on the flow cell 30, a detection region is formed at the focal position. The optical energy density in the detection region can be made high by shaping the irradiation light $L_1$ into a sheet-shaped flat top beam by the DOE 22. This makes it possible to observe light scattered from submicron-order particles floating over a wide range.

Figure 6:
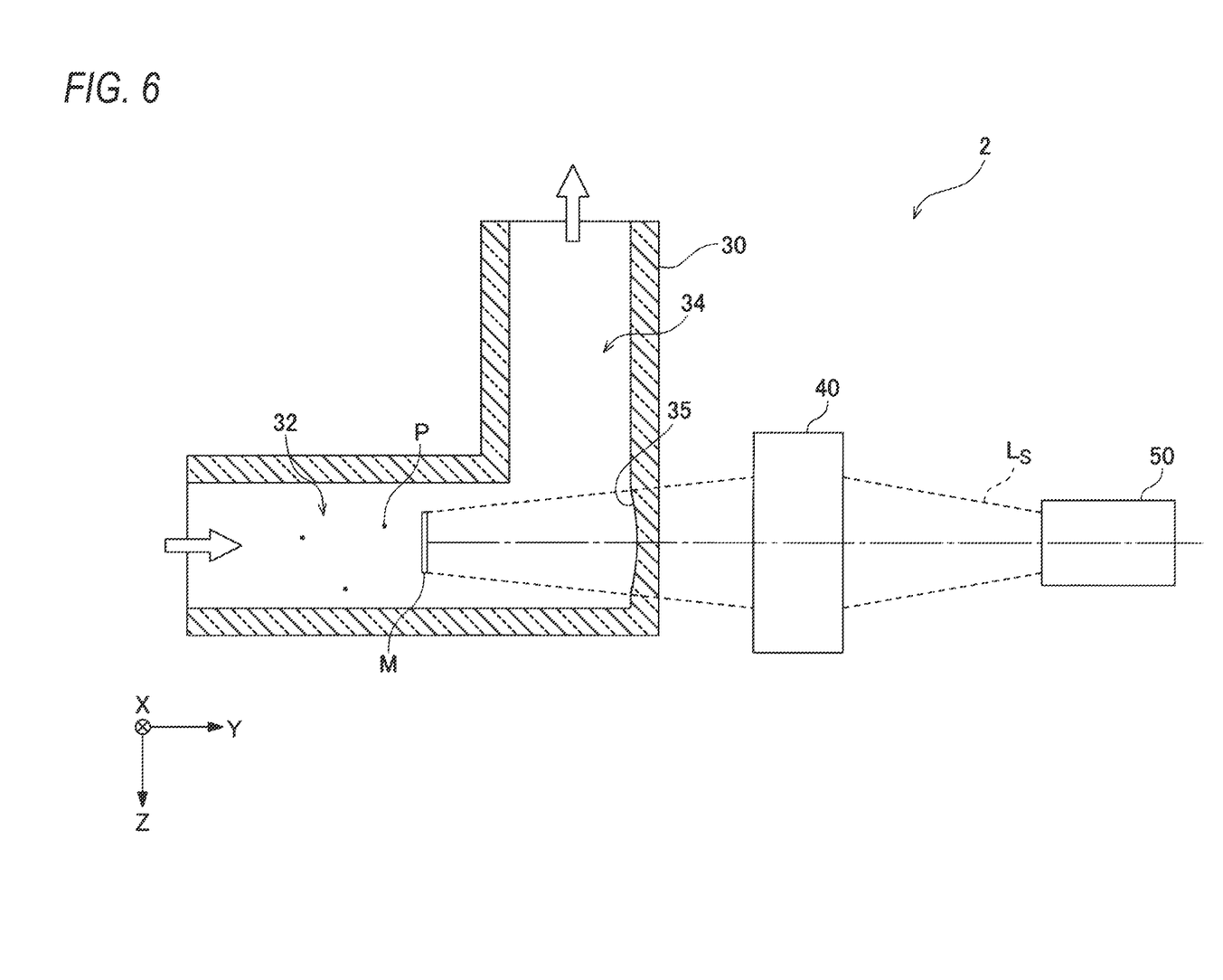
FIG. 6 is a vertical sectional view (a sectional view taken along a VI-VI cutting line shown in FIG. 2A) showing, in a simplified manner, the configuration of the detection unit employed in the one embodiment.

FIG. 6 is a vertical sectional view (a sectional view taken along a VI-VI cutting line shown in FIG. 2A) showing, in a simplified manner, the configuration of the detection unit 2 employed in the one embodiment. The condensing optical system 40 and the imaging unit 50 are not shown in the form of cross sections.

As described above, shaped irradiation light $L_1$ enters on the flow cell 30 in the X direction and forms a detection region M in the first section 32. The detection region M has a sheet-like shape whose longer sides extend in the Z direction, shorter sides extend in the Y direction, and depth (defocus range) is approximately equal to the length of the longer sides and is in the X direction.

A portion, located between the detection region M and the condensing optical system 40, of the inner wall surface of the flow cell 30 is formed with a concave surface portion 35 that has a concave shape and whose radius of curvature is approximately equal to its distance from the center of the detection region M. When scattered light $L_S$ that has been generated from a particle P passing through the detection region M enters on the inner wall surface of the flow cell 30, the scattered light $L_S$ may be refracted due to the difference between the refractive indices of a sample fluid and the flow cell 30. However, the concave surface portion 35 can suppress the refraction of the scattered light $L_S$ entering on the inner wall surface of the flow cell 30.

The positions of the condensing optical system 40 and the imaging unit 50 with respect to the flow cell 30 are determined with the optical axis of the condensing optical system 40 as a reference line, and the individual units are disposed so that the optical axis of the condensing optical system 40 passes through the center of the detection region M, the center of the concave surface portion 35, and the center of the light receiving surface of the image sensor of the imaging unit 50. The imaging unit 50, which is opposed to an XZ plane, observes movement of scattered light generated in the detection region M, that is, a diffusion movement of each particle P passing through the detection region M, and captures a moving image having a prescribed frame rate.

As described above, since the scattered light detection system (condensing optical system 40 and imaging unit 50) is disposed at such a position as to be opposed to a sample flow, movement of scattered light (a diffusion movement of each particle P) can be observed without decreasing the effective flow rate of a sample.

<Configuration of Control Computation Unit: See FIG. 1>

Next, the configuration of the control computation unit 3 will be described.

For example, the control computation unit 3 includes a control unit 60, an image acquisition unit 70, an image analyzing unit 80, a particle size analyzing unit 90, an output unit 100, etc. The control unit 60 controls the operations of the individual units of the detection unit 2 and a series of processing performed in the control computation unit 3. For example, the control unit 60 controls the emission of irradiation light by the light source 10, the flow velocity (a flow rate per unit time) of a sample to be caused to flow into the flow cell 30, and the capturing a moving image by the imaging unit 50. The flow velocity of a sample may be controlled by using a flow rate control device such as a mass flow controller provided additionally.

The image acquisition unit 70 acquires a still image of each frame (frame image) from a moving image captured by the imaging unit 50 at a prescribed frame rate. The image analyzing unit 80 correlates images of each particle captured in frame images of consecutive frames, determines its locus, and determines movement amount in the two-dimensional directions (X direction and Z direction) of Brownian motion every frame image.

The particle size analyzing unit 90 performs to obtain a particle size (diffusion coefficient-correspondent size) of each particle with analyzing on the basis of its movement amount analyzed by the image analyzing unit 80 and calculates number concentrations of respective particle sizes. A specific particle size analyzing method is not described here because it is similar to, for example, the method described in Japanese Patent No. 6,549,747 in which a diffusion coefficient is determined from a mean square displacement, sample viscosity, and a temperature and a particle size is calculated according to the Stokes-Einstein equation.

The output unit 100 outputs a result of the analysis performed by the particle size analyzing unit 90. The output unit 100 can output an analysis result in various manners such as display on the screen, output to a printer, and transmission to another device over a network.

Only major units of the control computation unit 3 are shown in FIG. 1 and it may include other units. For example, a scattered light intensity determining unit for determining a scattered light intensity-correspondent value of a particle from an average luminance value, a maximum luminance value, or the like of measurement values at respective measurement points on a locus of the particle determined by the image analyzing unit 80 may be provided. Furthermore, a characteristic analyzing unit for analyzing a characteristic of each particle on the basis of a diffusion coefficient-correspondent size determined by an analysis of the particle size analyzing unit 90 and a scattered light intensity-correspondent value determined by the scattered light intensity determining unit may be provided. For example, the characteristic analyzing unit determines a refractive index of a particle or discriminates between a particle and an air bubble on the basis of relationships between the relative scattered light intensity and the known particle size and the known refractive index that were obtained in advance using sample particles whose particle sizes is already known and can generally be regarded as a single and same particle size, such as polystyrene latex particles. For another example, a storage unit for storing an analysis result etc. may be provided.

The frame rate of a moving image and the flow velocity of a sample are controlled so that a prescribed number of frame images can be acquired for each particle from a captured moving image. For example, the flow velocity of a sample is set at 60 µm/s to acquire 10 frame images from a captured moving image at 30 fps (30 frames per second) in a case that the length of the detection region M in the Y direction is 20 µm.

<Beam Shape Comparison>

Figure 7A:
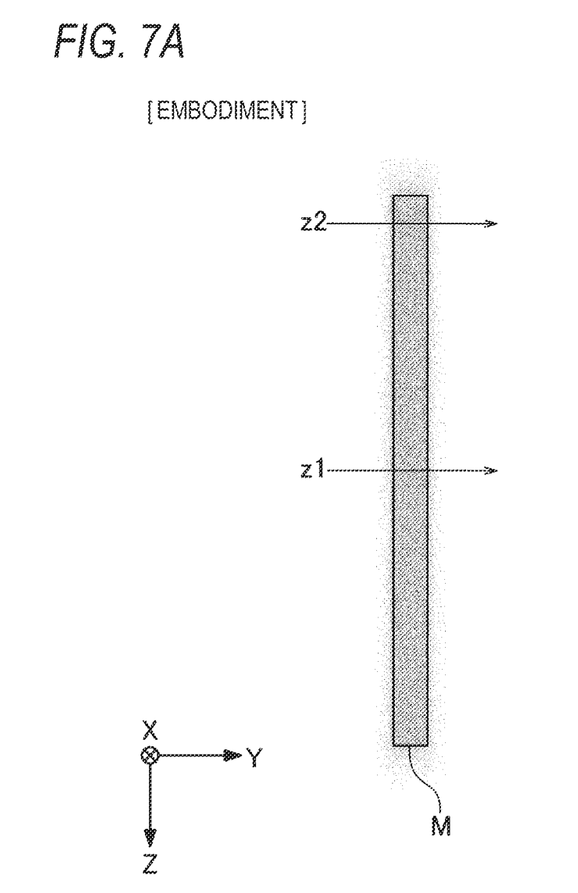
FIGS. 7A and 7B illustrate effects of the beam shape at a focal position through comparison between the one embodiment and a comparative example.
Figure 7B:
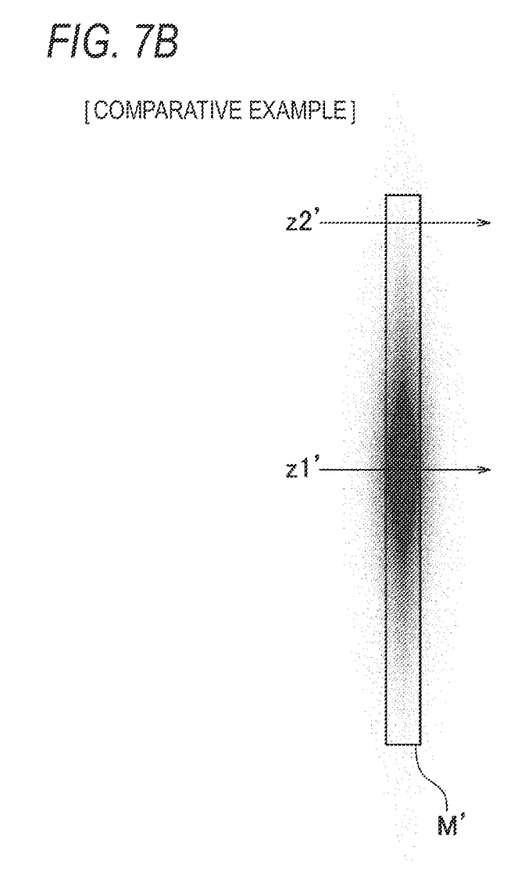

FIGS. 7A and 7B illustrate effects of the difference in the beam shape of irradiation light at the focal position through comparison between the embodiment and a comparative example. In FIGS. 7A and 7B, a light intensity distribution is indicated with light and dark shading of a color used, that is, a higher intensity region is drawn darker and a lower intensity region is drawn lighter.

To facilitate understanding of the invention, the beam shapes (longer side to shorter side ratio etc.) and the degrees of shading are exaggerated and do not coincide with actual ones. To enable comparison, it is assumed that in the embodiment and the comparative example the same frame rate of a moving image and the same flow velocity of a sample are employed and a movement in the XZ plane of each particle moving in the Y direction being carried by a flow of a sample fluid is captured at a prescribed frame rate.

FIG. 7A indicates a beam shape and an intensity distribution of the beam in the embodiment. As described above, in the embodiment, a detection region M is formed by a sheet-shaped flat top beam whose longer sides extend in the Z direction and shorter sides extend in the Y direction and that has defocus ranges having approximately the same length as the longer sides in the X direction.

That is, in the embodiment, the light intensity is approximately uniform in the entire detection region M which is located at the focal position. As a result, a movement of a particle P can be captured over a prescribed time (corresponding to a prescribed number of frames) in each of a case that the particle P moves in the Y direction at a position z1 that is approximately located at the center of the detection region M in the Z direction and a case particle P moves in the Y direction at a position z2 that is close to an end of the detection region M in the Z direction. Thus, according to the embodiment, the number of tracing times (i.e., the number of acquired frame images) of a diffusion movement of the particle P in the XZ plane can be made constant irrespective of where particle P passes, whereby the particle size resolution of the diffusion coefficient-correspondent size can be improved. Furthermore, the refractive index measurement error that depends on the particle passage position can be reduced.

FIG. 7B indicates a beam shape and an intensity distribution of the beam in the comparative example. In the comparative example, it is assumed that a detection region M' is formed by a Gaussian beam having an elliptical cross section. Furthermore, in this example, for comparison, it is assumed that the detection region M' is the same in shape as the detection region M in the embodiment and a region obtained by superimposing a rectangle having the same size as the detection region M shown in FIG. 7A on the Gaussian beam in such a manner that their centers coincide with each other is shown as the detection region M'. As is well known, the intensity distribution of a Gaussian beam is close to a Gaussian distribution and the light intensity is high in a central portion and is low in a peripheral portion.

That is, in the comparative example, since the light intensity is not uniform in the detection region M', the number of tracing times (i.e., the number of acquired frame images) of a diffusion movement of a particle P in the XZ plane necessarily varies depending on the position where the particle P passes. For example, the light intensity is higher, as a whole, at a position z1' that is approximately at the center of the detection region M' in the Z direction than at a position z2' that is near an end of the detection region M' in the Z direction. Thus, where the particle P passes the position z1' in the Y direction, a movement of the particle P can be captured over a prescribed time (corresponding to a prescribed number of frames). In contrast, where the particle P passes the position z2' in the Y direction, the capture-able time is shorter (i.e., the number of frames is smaller) than in the case where the particle P passes the position z1' in the Y direction. In this manner, in the comparative example, since the number of tracing times (i.e., the number of acquired frame images) of a diffusion movement of the particle P in the XZ plane varies depending on the passage position of the particle P, the particle size resolution of a diffusion coefficient-correspondent size necessarily deteriorates.

Thus, in the above-described embodiment, the particle size resolution of a diffusion coefficient-correspondent size (i.e., particle size measurement accuracy) can be improved compared to the comparative example.

<Intensity Distribution of Flat Top Beam>

Figure 8:
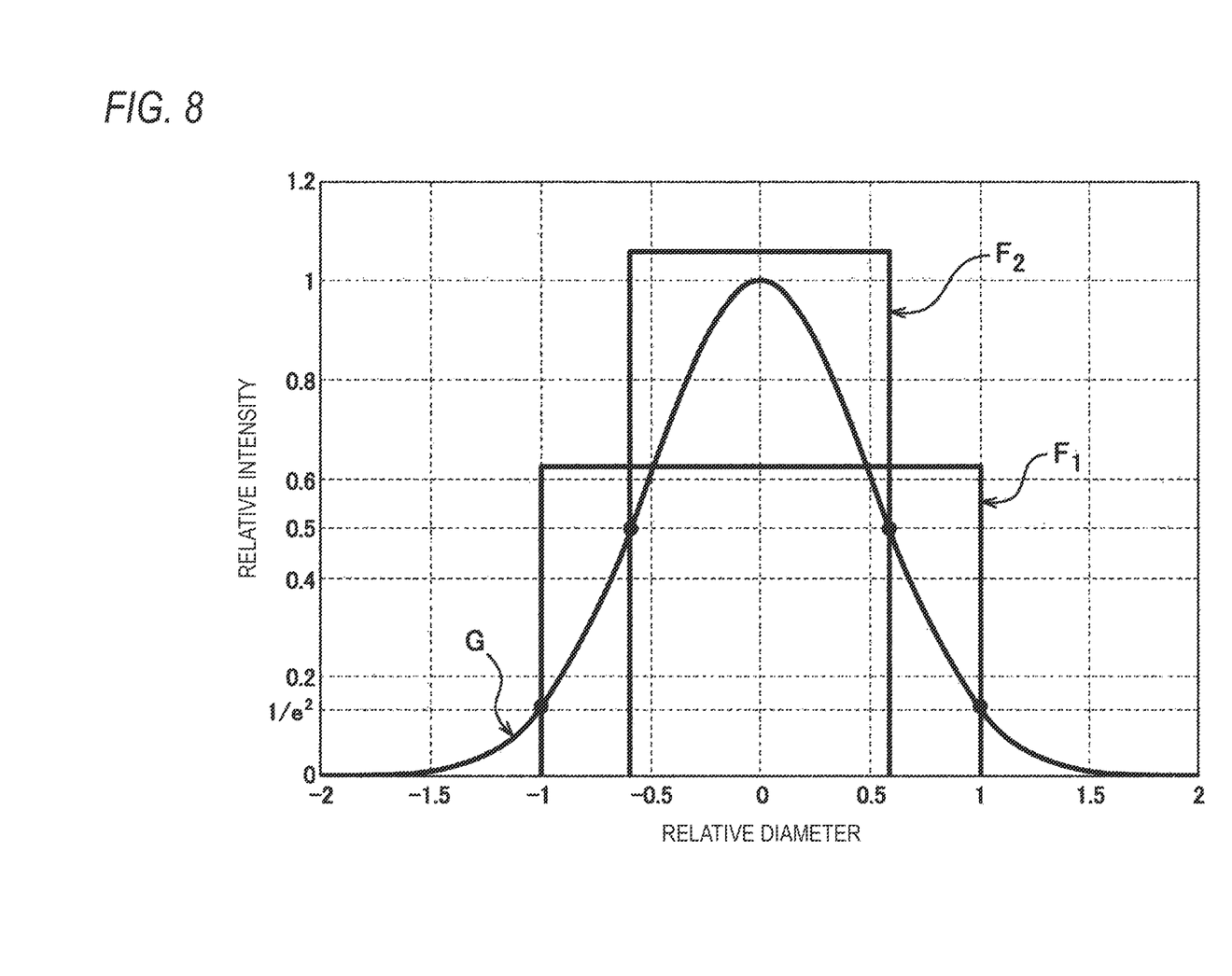
FIG. 8 shows a result of a simulation relating to the intensity of light that has been shaped into a flat top beam.

FIG. 8 shows a result of a simulation relating to the intensity of light that has been shaped into a flat top beam. In the graph of FIG. 8, a curve G shows an intensity distribution of a Gaussian beam (Gaussian distribution). Each of Curves $F_1$ and $F_2$ shows a simulated intensity distribution in a case that the Gaussian beam of the curve G has been shaped into a flat top beam having a prescribed beam width.

Curve $F_1$: an intensity distribution of a case that a Gaussian beam is shaped into a flat top beam having a beam width that is equal to a diameter of the Gaussian beam at which the intensity is equal to $1/e^2$ (=0.135) times its center intensity. In this flat top beam, the light intensity is constant at about 63% of the peak value of the Gaussian distribution. Where a measurement is performed using a Gaussian beam, in the case of making comparison between the center position and the outer circumference position of the beam each, magnitude of a detection signal for light scattered from a particle with same size vary by a factor of about 7.4 (=1/0.135). In contrast, where a particle having the same size is measured using a flat top beam having the intensity distribution of the curve $F_1$, the light intensity is decreased to about 63% of the peak intensity of the Gaussian distribution. However, if this demerit is permitted, magnitude of the detection signals of scattered light beams from particles located at different positions and having the same diameter can be made identical.

Furthermore, the time taken by a particle to pass through the detection region, that is, the time during which a particle can be observed with a prescribed light scattering intensity can be made the same irrespective of where the particle passes. Furthermore, in observing diffusion movements of particles in the XZ plane, the variation of the number of tracing times can be suppressed in a region that is two times as wide as a region corresponding to $1/e^2$ of the center intensity of a Gaussian distribution (a flat top beam represented by a curve $F_1$ having a relative intensity about 0.63 has a relative diameter 2 (−1 to 1) in contrast to the fact that a Gaussian beam represented by a curve G has a relative diameter 1 (−0.5 to 0.5)).

Curve $F_2$: an intensity distribution of a case that a Gaussian beam is shaped into a flat top beam having a beam width that is equal to a diameter of the Gaussian beam at which the intensity is equal to 0.5 times its center intensity. In this flat top beam, the light intensity is constant at about 105% of (i.e., about 1.05 times) the peak intensity of the Gaussian beam. That is, where a measurement is performed using this flat top beam, a higher light scattering intensity can be obtained than in a case of a measurement using the Gaussian beam.

The simulation values mentioned above are values of a case that the entire Gaussian beam are shaped into a flat top beam without any loss. However, actually, a small part of the Gaussian beam is converted into high-order diffraction light and removed and hence a numerical value is considered to decrease by that difference. Anyway, this does not influence the above-described simulation result.

ADVANTAGES OF THE INVENTION

As described above, the above-described embodiment provides the following advantages.

(1) Since irradiation light is shaped into a flat top beam having a sheet-like shape in the detection region by the DOE 22, an optical energy density and an effective flow rate can be secured that enable observation of light scattered from submicron-order particles floating in a wide range.

(2) Since a detection region is formed by a sheet-shaped flat top beam whose longer sides extend in the Z direction and shorter sides extend in the Y direction and in which a defocus range having approximately the same length as the longer sides is secured in the X direction, the light intensity is approximately uniform in the entire detection region. Thus, irrespective of a position in the Z direction that a particle passes in the Y direction, a movement of the particle in the XZ plane can be captured over approximately the same time (corresponding to approximately the same number of frames) and the particle can be traced a certain number of times (i.e., the number of frame images can be acquired). As a result, the particle size resolution for a diffusion coefficient-correspondent size can be improved.

(3) Since irradiation light is shaped into a flat top beam using the DOE 22, the configuration of the DOE 22 can be made simpler than in a case of using another optical system (e.g., optical lenses).

(4) Since the beam expander 21 is disposed between the light source 10 and the DOE 22, the shape of irradiation light can be adjusted to a shape that satisfies requirements of the DOE 22 while the angle of beam divergence of the irradiation light as emitted from the light source 10 is adjusted.

(5) Since the plural different slit plates 23-25 are arranged between the DOE 22 and the focal point of irradiation light, irradiation light shaped by the DOE 22 can reach the focal point after passing through the plural slits 23a-25a surely while high-order diffraction light diverging from the DOE 22 can be interrupted stepwise by the plural interruption surfaces 23b-25b. Thus, whereas light that is necessary for a measurement is secured, noise can be suppressed by removing, effectively, stray light that would otherwise obstruct the measurement.

The present invention can be implemented being modified in various manners without being restricted by the above-described embodiment.

Although in the above-described embodiment the beam shape of irradiation light at the focal position is such that the length in the Y direction is 20 μm and the length in the Z direction is 2 mm, this is just an example and these lengths are not limited to these values. These lengths may be set as appropriate according to the performance of the imaging unit 50.

In the above-described embodiment, shaped irradiation light $L_1$ is entered the first section 32 from the X direction. Alternatively, it may be entered the first section 32 from the Z direction. In this case, a detection region is formed by a sheet-shaped flat top beam whose longer sides extend in the X direction and shorter sides extend in the Y direction and in which a defocus range is secured in the Z direction.

The above-described embodiment is directed to the example of the case that the particle measuring device 1 is an FPT device. However, the particle measuring device 1 is not limited to an FPT device and may be a light scattering particle counter that counts particles or determine particle sizes on the basis of the intensity values of light scattered from each of particles contained in a fluid. In this case, a photodetector configured with such as a light receiving element may be provided in place of the imaging unit 50 and a signal analyzing unit for analyzing a photodetection signal that is output from the photodetector may be provided in place of the image analyzing unit 80. In this configuration, since a sheet-shaped detection region that is uniform in the intensity of irradiation light is formed, intensity values of light scattered from particles having the same particle size can be made uniform irrespective of passage positions of the particles, whereby the particle size resolution which corresponds to light scattering-correspondent size can be improved.

Furthermore, the example materials, numerical values, etc. employed above as of the individual units or components of the particle measuring device 1 are just examples and it goes without saying that they may be changed as appropriate in practicing the invention.

The present application is based on Japanese Patent Application No. 2019-237757 filed on Dec. 27, 2019, the disclosure of which is incorporated herein by reference.

The invention claimed is:

1. A particle measuring device, comprising:
a diffractive optical element configured to shape light for irradiating a particle into a flat top beam, where a cross section of the flat top beam at a focal position has a substantially oblong-and-sheet shape;
a flow cell configured to form a flow passage for a sample therein;
a light source configured to emit irradiation light;
a photodetector element located opposed to a flow direction of the sample and at a position obtained by extending a prescribed section of the flow passage in the flow direction of the sample,
wherein the photodetector element detects light scattered from a particle included in the sample, where the particle passes a detection region formed in the prescribed section of the flow passage by irradiating with the irradiation light;
a processor configured to obtain a particle size of the particle with analyzing on a basis of the scattered light, in which the diffractive optical element shapes the irradiation light and irradiates the sample flowing through the prescribed section with shaped irradiation light; and
a slit configured to separate a principal light beam from high-order diffraction light generated in a process that the diffractive optical element shapes the irradiation light.

2. The particle measuring device according to claim 1, wherein the processor is further configured to adjust the irradiation light emitted from the light source so that to have a diameter and an angle of beam divergence that satisfy requirements of the diffractive optical element, and enter adjusted irradiation light on the diffractive optical element.

3. The particle measuring device according to claim 1, wherein the diffractive optical element performs shaping into a flat top beam in which a variation of an optical energy density in a depth-of-focus direction of the irradiation light is in a prescribed range.

4. The particle measuring device according to claim 1, wherein the slit separates the principal light beam from the high-order diffraction light stepwise while causing the principal light beam of the irradiation light shaped by the diffractive optical element to pass, by means of a plurality of slits that are arranged so as to be spaced from each other located along an optical axis of the principal light beam.

5. The particle measuring device according to claim 1, wherein a portion of an inner wall surface of the flow cell, located between the detection region and the photodetector element, includes a concave surface portion.

6. The particle measuring device according to claim 1, wherein the photodetector element captures the scattered light at a prescribed frame rate, and
wherein the processor calculates movement amount of the particle in a plane that is perpendicular to the flow direction on a basis of bright spot position of the particle corresponding to the scattered light captured in respective frame images, and obtains a diffusion coefficient-correspondent size of the particle with analyzing on a basis of the movement amount.

7. The particle measuring device according to claim 1, wherein the photodetector element receives the scattered light and outputs signals corresponding to its intensity values, and wherein the processor obtains a light scattering-correspondent size of the particle with analyzing on a basis of the signals.

8. The particle measuring device according to claim 1, wherein the light source emits the irradiation light to the detection region in a direction perpendicular to an extension of the flow direction toward the photodetector element.

9. The particle measuring device according to claim 1, wherein, in the flow direction, the detection region overlaps with the photodetector element.

10. The particle measuring device according to claim 4, wherein the slit closest to the diffractive optical element is larger than the slit furthest from the diffractive optical element.

11. The particle measuring device according to claim 1, wherein the detection region has a sheet-like shape whose longer sides extend perpendicular to the flow direction.

\* \* \* \* \*